May 21, 1929.  L. B. SPERRY  1,713,930
PITCH INDICATOR
Filed April 14, 1922
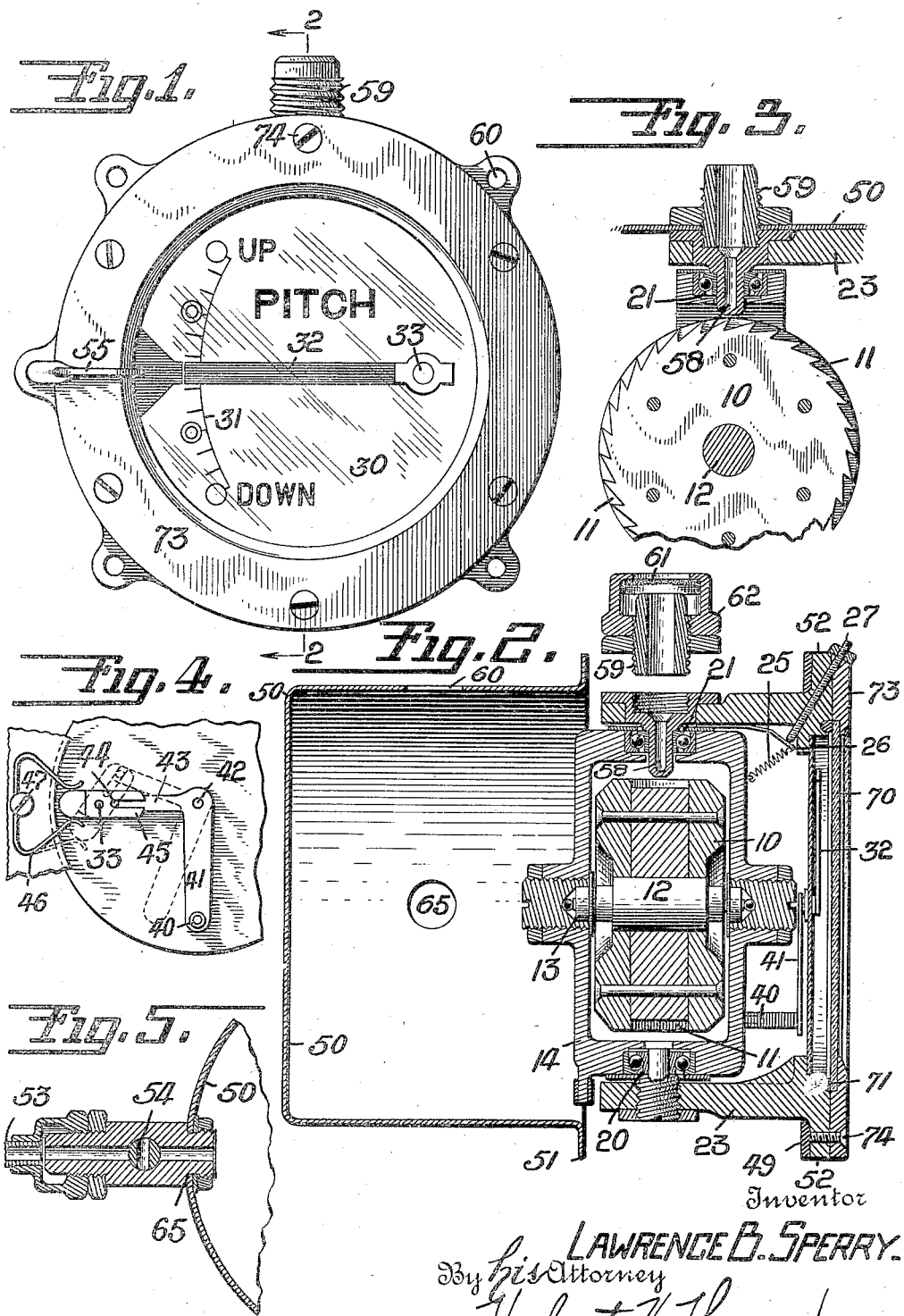
Inventor
LAWRENCE B. SPERRY.
By his Attorney
Herbert H. Thompson Patented May 21, 1929.

1,713,930

UNITED STATES PATENT OFFICE.

LAWRENCE B. SPERRY, OF FARMINGDALE, NEW YORK, ASSIGNOR, BY MESNE ASSIGNMENTS, TO SPERRY GYROSCOPE COMPANY, INC., A CORPORATION OF NEW YORK.

PITCH INDICATOR.

Application filed April 14, 1922. Serial No. 552,464.

This invention relates to pitch indicators adapted to be applied to dirigible craft, especially aircraft, for indicating to the operator change of pitch and rate of change of pitch of the craft, i. e., whether the longitudinal axis thereof is tilting upwardly or downwardly, and hence, whether the craft is changing its fore and aft inclination. This instrument is especially valuable in connection with the flight of aircraft in clouds or at night when landmarks and the horizon are obscured.

Other objects and advantages will hereinafter appear.

In the accompanying drawings;

Fig. 1 is a front elevation of the assembled pitch indicator.

Fig. 2 is a vertical section of the pitch indicator on the line 2—2 of Fig. 1, the various parts being disassembled.

Fig. 3 is an enlarged detail, partially sectioned vertically, showing the gyroscope driving means.

Fig. 4 is a detail showing the linkage for transmitting movements of the gyroscope to the indicator hand.

Fig. 5 is a section taken longitudinally through the control valve for the gyroscope driving means.

The type of pitch indicator herein illustrated utilizes the precessional movements of a suitably mounted gyroscope upon pitching of the craft. For this purpose the instrument comprises a gyroscopic rotor 10 having buckets 11 formed in its periphery so that it may be driven by a stream of air or other fluid pressure as will be more fully described hereinafter. The rotor is fixed to a shaft 12 mounted horizontally in bearings 13 in a gimbal ring 14, the latter being in turn journalled in bearings 20, 21, formed in a frame 23, for rotation about a vertical axis. In other words, both the precessional and spinning axes are at an angle to the axis of pitch which is of course the transverse axis of the aircraft.

The indicator illustrated is adapted to be mounted on the instrument board of the aircraft in front of the aviator as by means of screw eyes 60.

By means of the above described mounting of the gyroscope, if the instrument is positioned on the vehicle so that the axis of rotation of the rotor is longitudinal of the vehicle, any upward or downward tilting of the longitudinal axis of the vehicle will cause precession of the gyroscope around the vertical axis through bearings 20, 21. The precessional movements of the gyroscope are opposed by a centralizing spring 25 fixed at one end to a spring member 26 on the main frame of the indicating device and at its other end to the gimbal ring 14. The centralizing spring operates to prevent wandering of the gyroscope, causes the precession of the gyroscope and, hence, the rotation of ring 14 to be proportional to the pitch, and restores the parts to initial position when the craft moves horizontally or at a uniform inclination. The spring may be adjusted from outside the indicator by means of an adjusting screw 27 engaging the spring member 26.

To secure an indication of said precessional movements, there is provided at the front of frame 23 a dial plate 30, having indications 31 denoting degrees of pitch, and with which cooperates an index hand or pointer 32 fixed upon a shaft 33 pivoted in and extending through the dial plate to the rear thereof.

Pivotal axis 33 of the index 32 is therefore normally substantially horizontal and at an angle both to the vertical axis and the transverse axis of the aircraft, i. e., at an angle to the precessional axis of the gyroscope.

To transmit the precessional movements of the gyroscope to said pointer, any suitable mechanism may be employed. In the present instance, there is provided a closely-wound spring 40 fixed at one end to the gimbal ring and at the other end to one arm 41 of a bell crank pivoted at 42 upon the dial plate. The other arm 43 of said bell crank is provided with a pin 44 engaging the forked end of a lever 45 fixed to the shaft 33 which carries the pointer or index hand 32. It will thus be obvious that any precessional movements of the gyroscope in one direction or the other will be transmitted through spring 40 and the bell-crank to lever 45 and the pointer.

Since the linkage mounted on the dial-plate is delicate compared with the gyroscopic mechanism, it is desirable to reinforce it in some manner, as by a centralizing spring 46. Said spring is preferably fastened to the main frame at the rear of the dial-plate, as by a screw 47, and engages on either side of the outer arm of lever 45. In this manner, any movements of the indicating linkage will be against the action of spring 46 which will also tend to restore the linkage to zero or initial position. Where a centralizing spring 46 is employed, it may be made of such strength as to obviate the use of centralizing spring 25. On the other hand, centralizing spring 25 may be of such strength as to obviate the use of an additional spring 46. However, where the two centralizing springs are used, each spring may be weaker and more delicately adjusted.

The frame 23 is merely of skeleton construction permitting free access to the gyroscopic mechanism which it supports. However, since the gyroscope is air-driven (in the present instance) it is necessary to enclose it in an air-tight casing. For this purpose, there is provided a casing 50 having one side open to receive the gyroscopic and indicating mechanism supported by frame 23, there being a flange or collar 51 adjacent said open side for contact with the flanged portion 52 of the frame 23. The usual washer 49 may be interposed between said flanged surfaces before they are fastened together in any suitable manner, as by screws.

As hereinbefore stated, the gyroscope, in the present instance, is air driven. For this purpose, air is sucked out of the air-tight casing by any suitable means, such as a Venturi tube having its axis in the line of flight, the narrow portion of said tube being connected by a pipe 53 to a stop-cock 54 which controls the suction of air out of the casing. The stop-cock may be controlled from the front of the casing by means of an extension 55 terminating at the front of the indicator in the form of a handle. The air which is sucked out of the casing is replaced by air drawn in through one or more nozzles terminating adjacent the bucket 11 of the rotor. In the present case, the bearing 21 is provided with a longitudinal bore 58 so that said bearing acts also as a nozzle. The bore 58 extends to the outside of the casing by means of an extension tube 59 screwed into the outer end of bearing 21 and passing through an opening 60 in the casing 50. A screen 61 suitably mounted in a member 62 may be threaded upon the outer end of the nozzle to filter the air sucked in. The casing is provided with an additional opening 65 through which the exhaust pipe 53 communicates with the interior.

From the above description it will be apparent that there is provided a simple device in which the gyroscope is driven by the passage of the vehicle through the air, and in which the gyroscope is so mounted that any change of tilt of the longitudinal axis of the vehicle upwardly, or downwardly, will be indicated. It is also apparent that because of the multiple gearing between gimbal ring 14 and the indicator hand 32, even slight movements of said ring will result in appreciable movements of hand 32, thus rendering the device extremely sensitive.

The dial plate 30 and indicator hand 32 may be enclosed in the usual manner by a transparent plate or window 70 held in position against the usual washer 71 and against flanged portion 52 by a clamping ring 73 attached to said flanged portion in any suitable manner, as by screws 74.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention, what I claim and desire to secure by Letters Patent is:

In combination, a vehicle, an indicator therefor, a movable index, a gyroscope mounted for precession about a vertical axis in response to angular movements of the longitudinal axis of the vehicle in a vertical plane, a movable connection between said gyroscope and said index whereby precessional movements of said gyroscope are transmitted to said index, said connection comprising a bell-crank, a connection between said gyroscope and one arm of said bell-crank, a lever fixed to said index, the other arm of said bell-crank being connected to one arm of said lever, and a fixedly connected centralizing spring engaging the other arm of said lever.

In testimony whereof I have affixed my signature.

LAWRENCE B. SPERRY.